(12) United States Patent
Nunes

(10) Patent No.: US 8,670,225 B2
(45) Date of Patent: Mar. 11, 2014

(54) DATA LOGGING DEVICE FOR SUPPLY CHAIN MANAGEMENT

(75) Inventor: Peter M. Nunes, Amesbury, MA (US)

(73) Assignee: Carrier Corporation, Farmington, CT (US)

( * ) Notice: Subject to any disclaimer, the term of this patent is extended or adjusted under 35 U.S.C. 154(b) by 242 days.

(21) Appl. No.: 13/119,877

(22) PCT Filed: Sep. 18, 2009

(86) PCT No.: PCT/US2009/057464
§ 371 (c)(1),
(2), (4) Date: Mar. 18, 2011

(87) PCT Pub. No.: WO2010/033793
PCT Pub. Date: Mar. 25, 2010

(65) Prior Publication Data
US 2011/0170249 A1    Jul. 14, 2011

Related U.S. Application Data

(60) Provisional application No. 61/099,096, filed on Sep. 22, 2008.

(51) Int. Cl.
*H05K 5/00*    (2006.01)
*H05K 7/00*    (2006.01)
*G08B 17/00*    (2006.01)

(52) U.S. Cl.
USPC ..................... 361/679.01; 340/584

(58) Field of Classification Search
USPC ........ 361/679.01, 679.33–679.4; 340/539.22, 340/584
See application file for complete search history.

(56) References Cited

U.S. PATENT DOCUMENTS

| 3,878,539 A | * | 4/1975 | Gooding | 340/546 |
| 5,691,882 A | * | 11/1997 | Ma | 361/679.32 |
| 5,748,511 A | * | 5/1998 | Mansutti et al. | 708/109 |
| 6,078,269 A | * | 6/2000 | Markwell et al. | 340/517 |
| 6,334,788 B1 | * | 1/2002 | Sakaguchi et al. | 439/528 |
| 6,371,398 B1 | * | 4/2002 | Liao | 242/378.1 |
| 6,386,908 B2 | * | 5/2002 | Kato et al. | 439/528 |

(Continued)

FOREIGN PATENT DOCUMENTS

JP    2008-024385    2/2008

OTHER PUBLICATIONS

Notification of Transmittal of the International Search Report and the Written Opinion of the International Searching Authority, or the Declaration; PCT/US2009/057464; Mailed Apr. 30, 2010; Korean Intellectual Property Office.

*Primary Examiner* — Adrian S Wilson
(74) *Attorney, Agent, or Firm* — Cantor Colburn LLP

(57) ABSTRACT

A portable electronic data logging device for tracking information in a supply chain comprises electronics, a tethered communication interface and a housing. The electronics sense an environmental input and store data relating to the environmental input over a timescale. The tethered communication interface permits electronic communication of the data from the electronics to an external computer system. The housing encloses the electronics and includes an electronics compartment and an outer casing. The electronics compartment stores the electronics and includes an opening to permit the tethered communications interface to extend from the electronics compartment. The outer casing has a perimeter extending at least partially beyond the electronics compartment to form a channel into which the tethered communication interface can be stowed such that the tethered communication interface does not extend beyond an outer perimeter of the outer casing when not in use.

7 Claims, 8 Drawing Sheets

(56) References Cited

U.S. PATENT DOCUMENTS

| | | | |
|---|---|---|---|
| 6,401,892 B1 * | 6/2002 | Chang | 191/12.4 |
| 6,415,898 B1 * | 7/2002 | Liao | 191/12.4 |
| 6,439,768 B1 * | 8/2002 | Wu et al. | 374/169 |
| 6,542,757 B2 * | 4/2003 | Bae | 455/575.2 |
| 6,567,273 B1 * | 5/2003 | Liu et al. | 361/737 |
| 6,705,890 B2 * | 3/2004 | Kitou et al. | 439/528 |
| 6,705,891 B1 * | 3/2004 | Lin | 439/528 |
| 6,727,429 B1 * | 4/2004 | Koessler | 174/50 |
| 6,736,661 B2 * | 5/2004 | Homer | 439/344 |
| 6,837,095 B2 * | 1/2005 | Sunshine et al. | 73/23.2 |
| 6,848,802 B2 * | 2/2005 | Chen | 362/85 |
| 6,926,554 B2 * | 8/2005 | Liow et al. | 439/528 |
| 7,104,816 B1 * | 9/2006 | Wang | 439/136 |
| 7,121,877 B2 * | 10/2006 | Lin | 439/502 |
| 7,300,306 B2 * | 11/2007 | Le et al. | 439/502 |
| 7,392,150 B2 | 6/2008 | Kuepper et al. | |
| 7,578,698 B1 * | 8/2009 | Thia et al. | 439/528 |
| D601,561 S * | 10/2009 | Nunes et al. | D14/358 |
| 7,630,864 B2 | 12/2009 | Shoenfeld | |
| 7,644,867 B2 * | 1/2010 | Lin et al. | 235/486 |
| 7,722,369 B2 * | 5/2010 | Bushby | 439/134 |
| 2003/0006907 A1 * | 1/2003 | Lovegreen et al. | 340/870.16 |
| 2003/0165237 A1 * | 9/2003 | Farr et al. | 379/430 |
| 2004/0139279 A1 * | 7/2004 | Hoogerdijk | 711/115 |
| 2005/0112938 A1 * | 5/2005 | Liow et al. | 439/528 |
| 2005/0151643 A1 * | 7/2005 | Rajapakse et al. | 340/545.2 |
| 2005/0157774 A1 * | 7/2005 | DiLuiso et al. | 374/163 |
| 2005/0170686 A1 * | 8/2005 | Thorland et al. | 439/501 |
| 2005/0178633 A1 * | 8/2005 | Liao | 191/12.4 |
| 2006/0027697 A1 * | 2/2006 | Gojanovic et al. | 242/388.1 |
| 2007/0008119 A1 * | 1/2007 | Pohle et al. | 340/539.22 |
| 2007/0061598 A1 * | 3/2007 | Bitton et al. | 713/194 |
| 2007/0115623 A1 * | 5/2007 | Shih | 361/683 |
| 2007/0141918 A1 * | 6/2007 | Ohta | 439/694 |
| 2007/0247800 A1 * | 10/2007 | Smith et al. | 361/683 |
| 2007/0247803 A1 * | 10/2007 | Eickholdt | 361/685 |
| 2007/0258204 A1 * | 11/2007 | Chang et al. | 361/683 |
| 2008/0052044 A1 * | 2/2008 | Shoenfeld | 702/188 |
| 2008/0084393 A1 * | 4/2008 | Kang et al. | 345/166 |
| 2008/0227380 A1 * | 9/2008 | Hsu et al. | 454/184 |
| 2008/0261441 A1 * | 10/2008 | Shih et al. | 439/501 |
| 2011/0107359 A1 * | 5/2011 | Lee et al. | 720/600 |

* cited by examiner

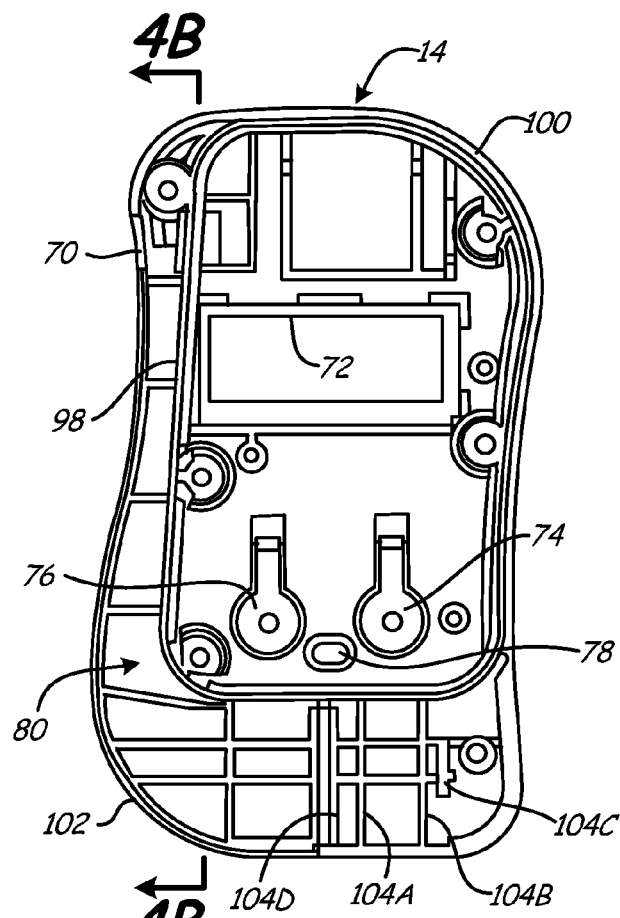 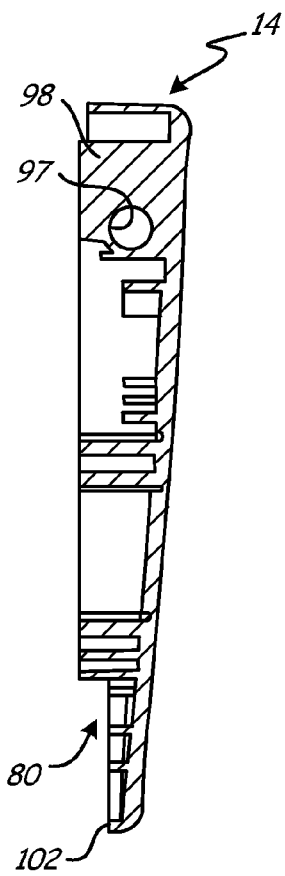
Fig. 4A
Fig. 4B

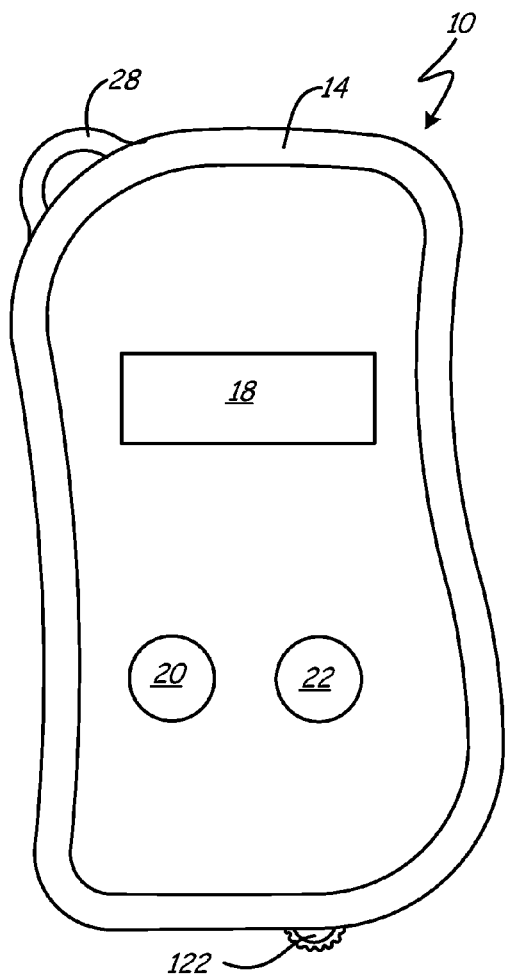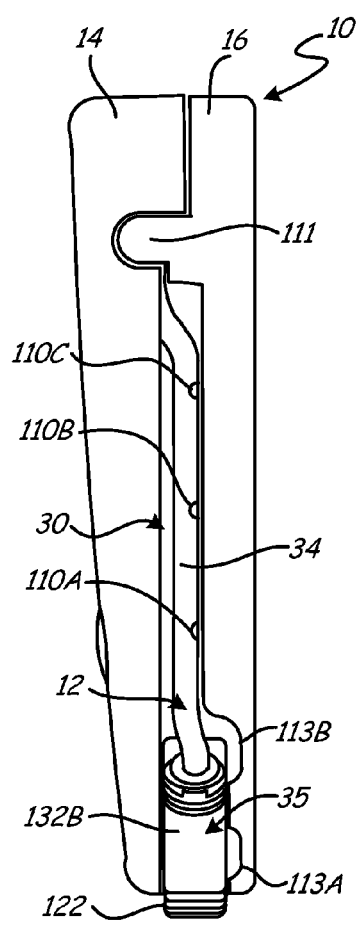
Fig. 8A    Fig. 8B
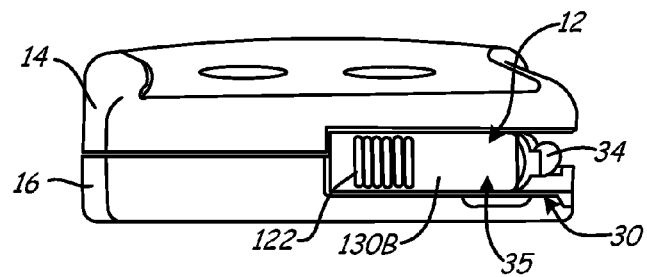
Fig. 8C

DATA LOGGING DEVICE FOR SUPPLY CHAIN MANAGEMENT

FIELD OF THE INVENTION

The present invention relates to electronic devices for supply chain management and more particularly to systems for communicating data to and from portable data loggers.

BACKGROUND

Monitoring the movement of goods from producer to consumer through the supply chain is becoming increasingly more challenging as goods are moved over increasingly larger distances in today's global economy. The challenge is increased for products that must be moved through a cold chain, the supply and distribution chain for products that must be kept within a specific temperature range, such as pharmaceuticals or perishable foods. The movement of products through a cold chain is further complicated due to regulatory concerns that require accurate monitoring of environmental conditions, such as temperature, to prevent loss of integrity, freshness or quality of environmentally sensitive goods. Thus, it becomes necessary to be able to generate a detailed transaction history for a particular product including the physical location, the time spent at each location, record of ownership, packaging configuration and environmental storage conditions for each product. Or, put more simply, it is necessary to trace the pedigree for each product to ensure product integrity and to satisfy regulatory oversight.

Data loggers provide the ability to passively record long-term data relating to cold chains without the need for continuous monitoring from quality control personnel or the like. Data loggers typically comprise small, self-contained electronic devices that are stowed in warehouses, or trucking, rail or shipping containers to monitor storage conditions such as temperature or humidity. As such, data loggers typically include a battery, electronic memory devices, sensors, LCD displays and circuitry. Upon arrival of the data logger at a receiving site, such as a manufacturer, distributor or clinical trial administrator, the pedigree information must be extracted from the logger such that it can be used both immediately at the site of the logger and at later at a remote location after transmission, such as over a network or the internet. Often the pedigree information is in the form of raw data that must be processed by proprietary software to be put into a user friendly report. Installation of such proprietary software, however, is both expensive and time consuming with respect to acquisition of useable data. Additionally, it is necessary to have hardware installed at the computer workstation, such as an infrared (IR) serial port interface or a universal serial bus (USB) interface, such that the pedigree information can be extracted. Not every computer workstation along the cold chain, however, has the necessary hardware installed. Furthermore, connection of the data logger to various types of data ports on the computer workstation can be difficult, as it is often cumbersome to mount the data logger to communication ports that are obstructed by placement of the workstation or are recessed into the workstation. There is, therefore, a need for a data logger having user friendly hardware and software to expedite generation of user friendly pedigree information reports.

SUMMARY

The present invention is directed to an electronic data logging device for tracking information in a product supply chain. The data logging device comprises electronics, a tethered communication interface and a housing. The electronics sense an environmental input and store data relating to the environmental input over a timescale. The tethered communication interface permits electronic communication of the data from the electronics to an external computer system. The housing encloses the electronics and includes an electronics compartment and an outer casing. The electronics compartment stores the electronics and includes an opening to permit the tethered communications interface to extend from the electronics compartment. The outer casing has a perimeter extending at least partially beyond the electronics compartment to form a channel into which the tethered communication interface can be stowed such that the tethered communication interface does not extend beyond an outer perimeter of the outer casing when not in use.

BRIEF DESCRIPTION OF THE DRAWINGS

FIG. 4A is a top view of the inside of the top case of the data logger of FIG. 3.

FIG. 4B is a side view of the top case taken at section 4B-4B of FIG. 4A showing an opening within a circuitry compartment wall.

FIG. 8A shows a front view of the data logger of FIG. 1 with the tethered communication interface in a stowed position.

FIG. 8B shows a side view of the data logger of FIG. 8A with the tethered communication interface in a stowed position.

FIG. 8C shows a bottom view of the data logger of FIG. 8A with the tethered communication interface in a stowed position.

DETAILED DESCRIPTION

Figure 1:
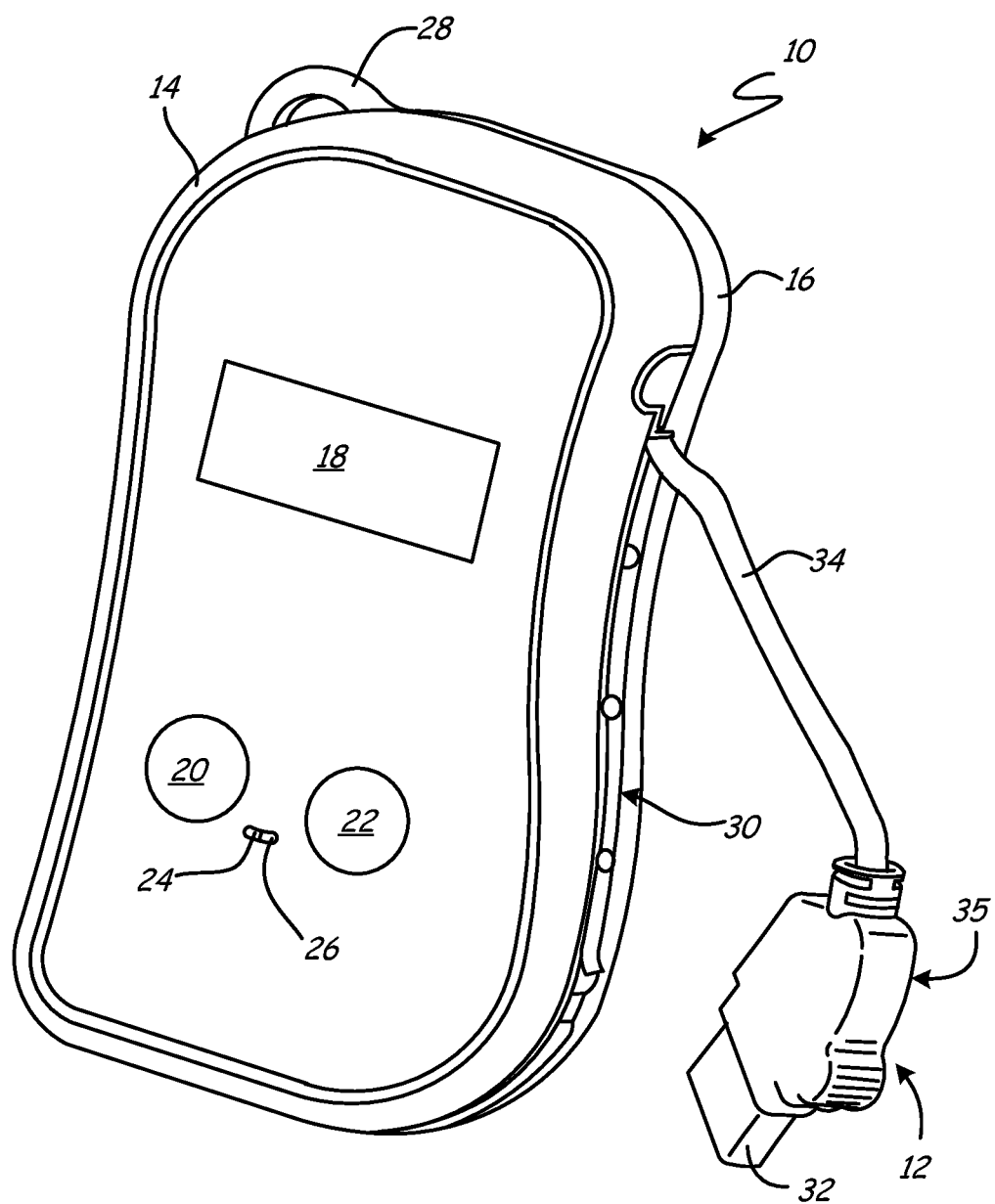
FIG. 1 is an isometric view of a data logger having a tethered communication interface of the present invention.

FIG. 1 is an isometric view of data logger 10 having tethered communication interface (TCI) 12 of the present invention. Data logger 10 also includes top case 14, bottom case 16, liquid crystal display (LCD) 18, start button 20, stop button 22, red light emitting diode (LED) 24 and green LED 26. Data logger 10 comprises a portable data monitoring device that is shipped along with environmentally sensitive goods such that the cold chain pedigree of data logger 10 and the goods can be recorded. For example, data logger 10 can be hung within a shipping container using hook 28, or can be buried within a cargo bin amidst the goods. As such data logger 10 is exposed to the same environmental conditions as the goods, including exposure to humidity, moisture, cold and frost.

Cold chain pedigree data is offloaded from data logger 10 through TCI 12 such that the data can be viewed, such as at a computer workstation, or communicated, such as over a network connection. Top case 14 and bottom case 16 are configured to stow TCI 12 within channel 30. Channel 30 is recessed within cases 16 and 18 such that TCI 12 can be tucked away to reduce the potential for damage. Within channel 30, TCI 12 is also sealed such that water and moisture is prevented from entering electrical components of data logger 10 and TCI 12. Data logger 10 includes circuitry and microcontrollers that record pedigree data from sensors, such as temperature or humidity sensors, and timers, and that allow TCI 12 to interface with computer workstations. Start button 20 permits an operator to begin data tracking with data logger 10, stop button 20 allows an operator to cease data tracking by data logger 10, and LCD 18 allows an operator to view information relating to the data tracking of data logger 10. TCI 12, which includes universal serial bus (USB) interface 32, extends from cases 14 and 16 with cable 34, and includes plug 35. Cable 34 and plug 35 allow data logger 10 to be easily and conveniently plugged into a computer workstation and oriented such that LCD 18, buttons 20 and 22 and LEDs 24 and 26 can be readily viewed. LEDs 24 and 26 alert an operator to the communication status of data logger 10 and TCI 12.

Figure 2:
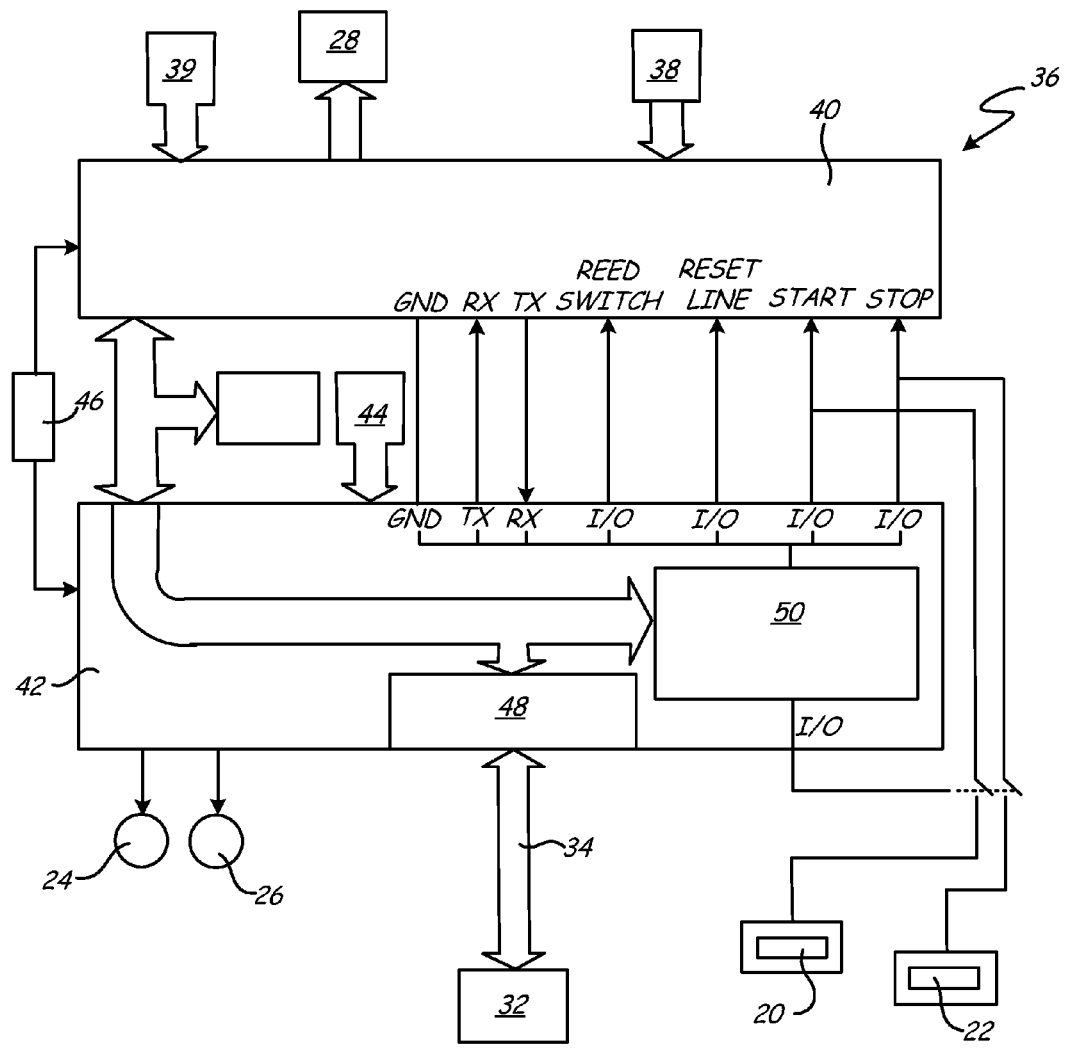
FIG. 2 is a schematic diagram illustrating the interface of circuitry of the data logger of FIG. 1 with the tethered communication interface.

FIG. 2 is a schematic diagram illustrating circuitry 36 of data logger 10 of FIG. 1. Circuitry 36 includes sensor 38, timer 39, data microcontroller 40, communications microcontroller 42 and memory device 44, and is connected to battery 46, start button 20, stop button 22, red LED 24, green LED 26, LCD 28, USB interface 32 and cable 34. Battery 46 is connected to data microcontroller 40 and communications microcontroller 42 to supply power to data logger 10 and typically comprises a disposable or rechargeable battery that can be replaced by an operator by accessing the insides of cases 14 and 16. Data microcontroller 40 is connected with sensor 38, which in various embodiments comprises a temperature sensor such as a thermister, or a humidity sensor, LCD 28 and timer 39. Data microcontroller thus collects raw data from sensor 38 and correlates the data to a timescale generated by timer 39. Basic information can be displayed on LCD 28 relating to the sensor and timer data. For example, LCD 28 displays a visual alarm if a minimum or maximum temperature threshold is exceeded. Data microcontroller 40 is also connected to start button 20 such that an operator is able to activate operation of data logger 10. Data microcontroller 40 ceases to collect pedigree data when an operator activates stop button 22. As data microcontroller 40 operates, communications microcontroller 42 is typically maintained dormant.

Communications microcontroller 42 is activated upon connection of USB interface 32 with an appropriate USB port on a computer workstation. USB interface 32 is configured for plug-and-play compatibility with computer workstations. Communications microcontroller 42 includes main program 48, which is responsible for generating and managing information files from data microcontroller 40, and file area 50, which provides a storage area for USB interface 32 to interact with information files and data generated by main program 48. When USB interface 32 is connected, communications microcontroller 42 initiates production of a data report for storage in memory device 44 such that useful data may be immediately obtained from data logger 10 at the computer workstation. The data report also contains embedded secure data that may be manipulated by proprietary software programmed to interpret and manipulate the secure data. In one embodiment, USB interface 32 comprises a male USB 2.0 connector. LEDs 24 and 26 indicate the status of USB interface 32 when USB interface 32 is connected to a computer workstation. For example, green LED 26 illuminates when USB interface 32 is initially plugged in. Then, green LED 26 is turned off, and red LED 24 is illuminated to indicate that communications microcontroller 42 is generating a data report for transmission to the computer workstation. After the data report is generate, red LED 24 is turned off and green LED 26 is again illuminated to indicate communications microcontroller 42 is in an active communication mode with the computer workstation. Once in an active communication mode, data and files, such as instructions, work orders, or invoices, can be exchanged between file area 50 and the computer workstation in a user friendly manner, such as through a conventional drag-and-drop interface on the computer workstation. Thus, an operator is able to access reports generated by main program 48 and open the reports using widely disseminated open-source software such as a portable document format (PDF) viewer. Additionally, an operator is able to access raw data for manipulation with proprietary software programs.

As such, circuitry 36 is configured to collect pedigree data concerning the movement of data logger 10 and goods through a cold chain. The data is delivered to memory device 44 and stored in various formats for later manipulation by operators using various proprietary and open source software. USB interface 32 and cable 34 allow the data to be extracted from data logger 10 such that the data can be accessed and viewed in a meaningful way by an operator such as in the form of reports and charts. It is desirable for circuitry 36 to be isolated within top case 14 and bottom case 16 to insulate circuitry from environmental factors such as moisture and humidity. It is also desirable to connect data logger 10 to a computer workstation in an expedient manner that facilitates interaction with data logger 10. Cable 34 is connected to communications microcontroller 42 to extend USB interface 32 from circuitry 36 such that data logger 10 can be more readily connected to a computer workstation in a user friendly manner, while circuitry 36 in maintained isolated within cases 14 and 16.

Figure 3:
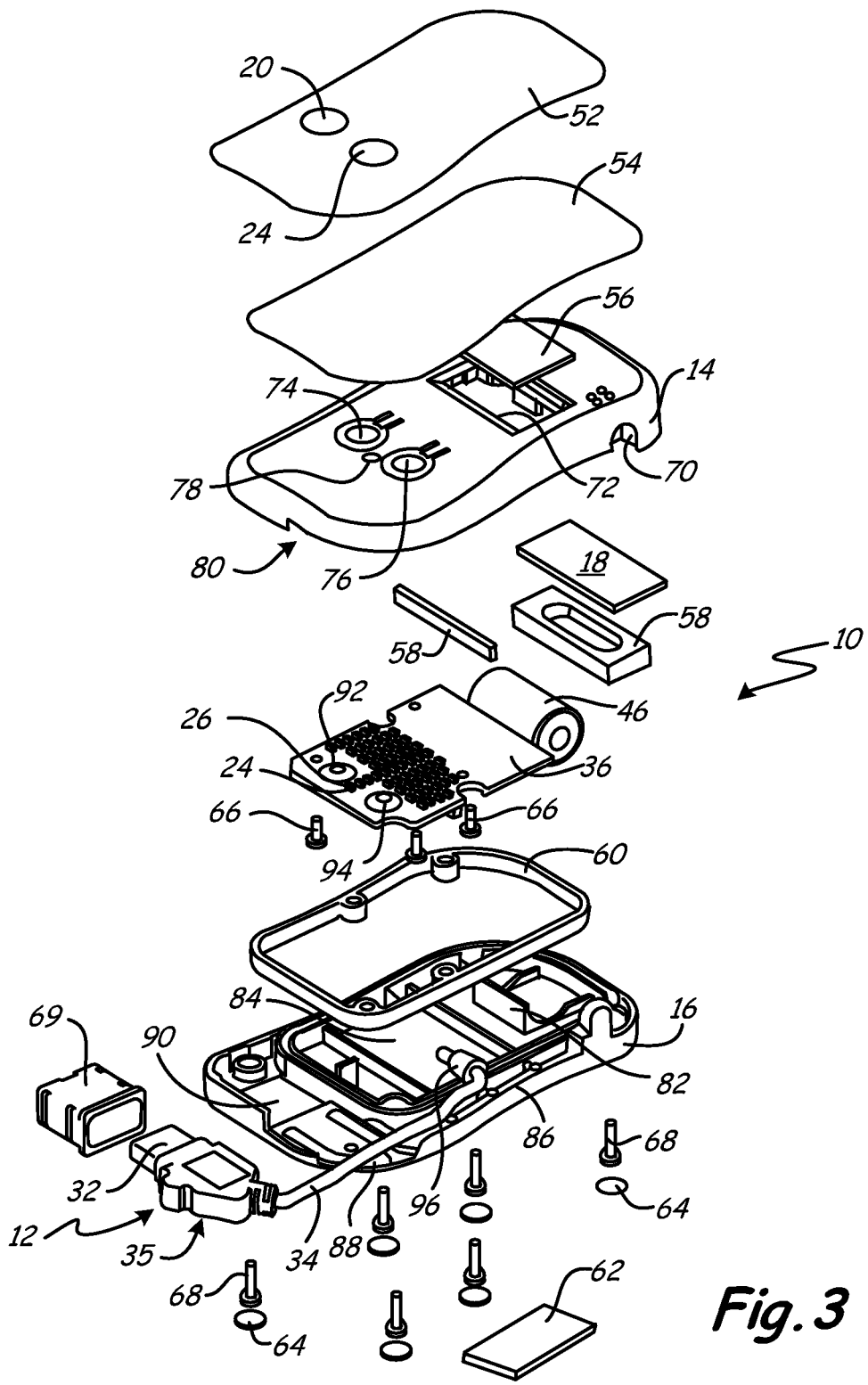
FIG. 3 is an exploded view of the data logger of FIG. 1 showing the tethered communication interface and the circuitry.

FIG. 3 is an exploded view of data logger 10 showing tethered communication interface 12 and circuitry 36. Data logger 10 also includes top case 14, bottom case 16, LCD 18, start button 20, stop button 22, red LED 24, green LED 26, USB interface 32, cable 34, battery 36, inlay label 52, clean label 54, lens 56, padding 58, gasket 60, rubber pad 62, fastener pads 64, circuitry fasteners 66, case fasteners 68, and USB boot 69.

Top case 14 comprises a first half of the outer shell of data logger 10 and includes ports for accessing circuitry 36 within data logger 10. Top case 14 includes USB port 70, which comprises an access point in top case 14 into which cable 34 extends to connect USB interface 32 to circuitry 36, and LCD port 72, into which LCD lens 56 is fitted to shield LCD 18. Top case 14 also includes levers 74 and 76, which comprise flexible detents such that depression of buttons 20 and 22 is transmitted to circuitry 36, and LED port 78 which allow LEDs 24 and 26 of circuitry 36 to shine through top case 14. Additionally, top case 14 comprises upper portion 80 of channel 30 (FIG. 1) for receiving plug 35 and cable 34. Inlay label 52 comprises a printable sheet upon which application specific information can be printed pertaining to buttons 20 and 22 and LEDs 24 and 26. Clean label 54 comprises a transparent layer for overlaying top case 14 and protecting lens 56, levers 74 and 76, and LED port 78.

Bottom case 16 comprises a second half of the outer shell of data logger 10 and includes trays for receiving the various components of data logger 10. Bottom case 16 includes battery tray 82 for receiving battery battery 46, circuitry tray 84 for receiving circuitry 36, lower portion 86 of channel 30 for receiving cable 34, slide area 88 for receiving plug 35, and boot tray 90 for receiving USB boot 69. Circuitry 36, which includes button switches 92 and 94, is fitted into circuitry tray 84 and secured with circuitry fasteners 66, which are secured to bottom case 16 within circuitry tray 84. Button switches 92 and 94 provide tactile switches for closing circuits embedded on circuitry 36. As described with respect to FIG. 2, circuitry 36 also includes various electronics, such as sensors, timers, memory devices, analog-to-digital converters and microcontrollers. Gasket 60 is fitted around circuitry 36 atop circuitry tray 84 and, when top case 14 is mounted to bottom case 16, prevents moisture from entering circuitry tray 84 and damaging circuitry 36. Circuitry 36 is fitted within circuitry tray 84 such that button switches 92 and 94 align with button levers 74 and 76, and LEDs 92 and 94 align with LED port 78. Battery 36 rests within battery tray 82 and is electrically connected to circuitry 36 to power LEDs 92 and 94, LCD 18 and the other components of data logger 10. LCD 18 is also electrically connected to circuitry 36 and positioned so as to be viewable through LCD port 72 and lens 56. Padding 58 maintains LCD 18 in position within circuitry tray 84. USB boot 69 is fitted into boot tray 90 and comprises a cap for receiving USB interface 32 and preventing moisture from entering USB interface 32. TCI 12 includes grommet 96, which is fitted into USB port 70 such that wires embedded within cable 34 are connectible to circuitry 36.

After assembly of top case 14 with its associated components and assembly of bottom case 16 with its associated components, case fasteners 68 are used to secure top case 14 to bottom case 16. Fastener pads 64 are attached to bottom case 16 over case fasteners 68, and rubber pad 62 is affixed to bottom case 16 to provide data logger 10 with grippable surfaces for placement upon surfaces during shipping. When data logger 10 is operating within a cold chain to track data, TCI 12 is tucked away within channel 30, slide area 88 and boot 69 such that data logger is sealed from moisture and condensation, and TCI 12 is protected from becoming entangled and damaged. Cable 34, however allows plug 35 to be slid away from slide area 88 and USB interface 32 removed from boot 69 such that data logger 10 can be easily connected to a USB port such as is found on a typical computer workstation.

FIG. 4A is a top view of the inside of top case 14 of data logger 10 of FIG. 3. FIG. 4B, which is discussed concurrently with FIG. 4A, is a side view of top case 14 taken at section 4B-4B of FIG. 4A showing opening 97 of circuitry compartment wall 98. Top case 14 includes USB port 70, LCD port 72, button levers 74 and 76, LED port 78, upper portion 80 of channel 30, circuitry wall 98, outer edge 100 and recessed edge 102. LCD port 72, button levers 74 and 76 are contained within circuitry wall 98, which is positioned within the interior of both outer edge 100 and recessed edge 102. Gasket 60 (FIG. 3) is positioned between circuitry wall 98 and bottom case 16 to maintain circuitry 36 sealed within data logger 10 between top case 14 and bottom case 16 when data logger 10 is assembled. As such LCD port 72, button levers 74 and 76 and circuitry wall 98 are contained within the outer perimeter of top case 14 and data logger 10 as defined by outer edge 100 and recessed edge 102. USB port 70 and upper portion 80 are positioned along outer edge 100 and recessed edge 102 of top case 14 to permit USB interface 32, cable 34 and plug 35 to be withdrawn into the perimeter of top case 14. USB port 70 comprises a notch within top case 14 where outer edge 100 and recessed edge 102 converge. USB port 70 is configured to receive grommet 96 of TCI 12 (FIG. 3) so that, along with opening 97 within circuitry wall 98, allows wires of cable 34 to engage circuitry 36. From USB port 70, cable 34 is permitted to flex to lie within upper portion 80 of channel 30. When assembled with bottom case 16, outer edge 100 is configured to contact bottom case 16 while recessed edge 102 is configured to be adjacent lower portion 86 of channel 30 (FIG. 3). Upper portion 80 includes ribs 104A-104D for engaging USB boot 69 such that when bottom case 16 is joined with top case 14, USB boot 69 is secured in place and prevented from sliding out into channel 30.

Figure 5:
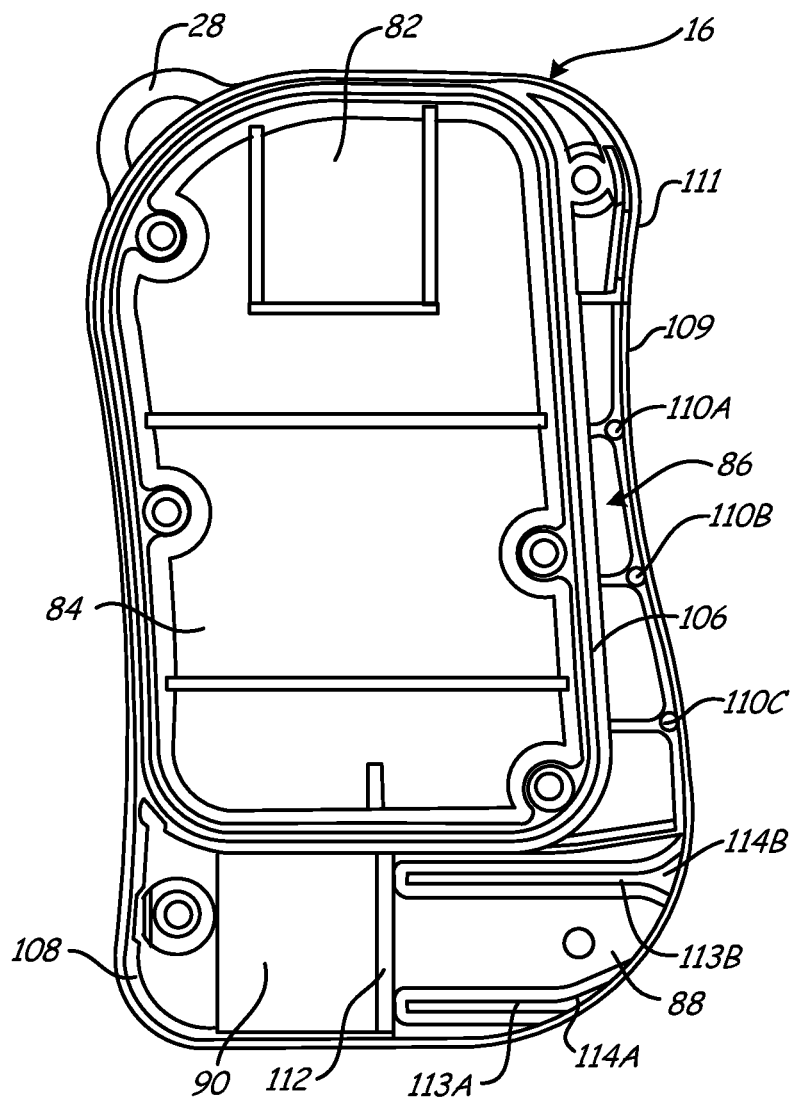
FIG. 5 is a top view of the inside of the bottom case of the data logger of FIG. 3.

FIG. 5 is a top view of the inside of bottom case 16 of data logger 10 of FIG. 4. Bottom case 16 includes hook 28, battery tray 82, circuitry tray 84, lower portion 86 of channel 30, slide area 88, boot tray 90, bottom circuitry wall 106, outer edge 108, recessed edge 109, detents 110A-110C, tab 111, rib 112 and tracks 113A and 113B. Battery tray 82 and circuitry tray 84 are contained within bottom circuitry wall 106, which is positioned within the interior of both outer edge 108 and recessed edge 109. Gasket 60 (FIG. 3) is positioned between top circuitry wall 98 and bottom circuitry wall 106 to maintain circuitry 36 sealed within data logger 10 between top case 14 and bottom case 16 when data logger 10 is assembled. As such battery tray 82, circuitry tray 84 and bottom circuitry wall 106 are contained within the outer perimeter of bottom case 16 and data logger 10, as defined by outer edge 108 and recessed edge 109. Slide area 88 and lower portion 86 of channel 30 are positioned along outer edge 108 to permit USB interface 32, cable 34 and plug 35 to be withdrawn into the perimeter of bottom case 16. Boot tray 90 is positioned within outer edge 108, and slide area 88 is positioned along recessed edge 109. Tab 111 is positioned along lower portion 86 where outer edge 108 and recessed edge 109 converge. Tab 111 comprises a flanged member that is configured to engage USB port 70 to force grommet 96 (FIG. 3) into opening 97 (FIG. 4B). From tab 111, cable 34 is permitted to flex to lie within lower portion 86 of channel 30. When assembled with top case 14, outer edge 108 is configured to be adjacent outer edge 100 of top case 14, while recessed edge 109 is configured to be adjacent recessed edge 102 of top case 14. Lower portion 86 includes rib 112 for engaging USB boot 69 such that when bottom case 16 is joined with top case 14, USB boot 69 is secured in place and prevented from sliding out into channel 30. Slide area 88 includes tracks 113A and 113B which facilitate insertion of plug 35 into USB boot 69. Tracks 113A and 113B comprised recessed channel within slide area 88 that engage guides on plug 35 to direct USB interface 32 into USB boot 69. Tracks 113A and 113B include entrances 114A and 114B, which are wider than tracks 113A and 113B to facilitate insertion of plug 35 into slide area 88. Recessed edge 109 includes detents 110A-110C for maintaining cable 34 recessed within channel 30. Detents 110A-110C comprise small, rounded protrusions that reduce the height of channel 30 to a dimension smaller than the thickness of cable 34. As such, cable 34 must be forcibly slid over detents 110A-110C to be inserted into and removed from channel 30.

Figure 6A:
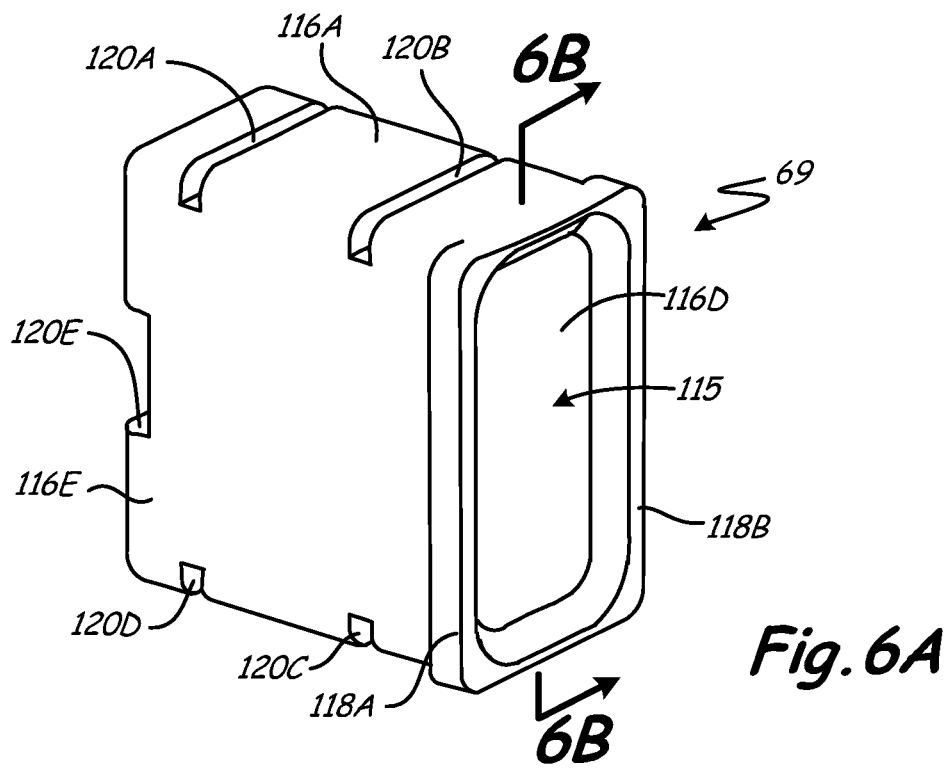
FIG. 6A is an isometric view of an interface boot for the tethered communication interface of FIG. 1.
Figure 6B:
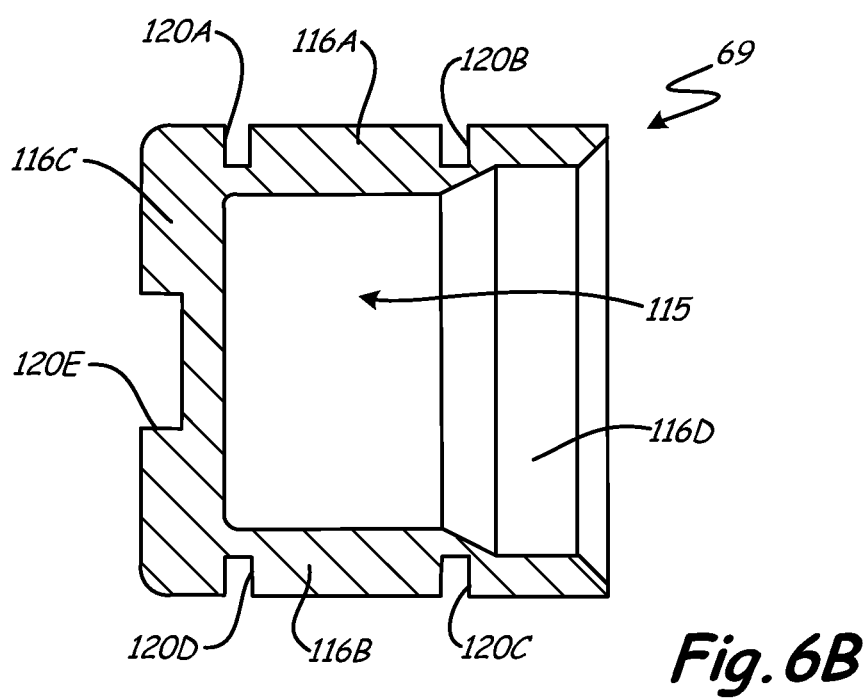
FIG. 6B is a top view of the interface boot taken at section 6B-6B of FIG. 6A showing an interior of the boot.

FIG. 6A is an isometric view of USB boot 69 for tethered communication interface (TCI) 12 of FIG. 1. FIG. 6B, which is discussed concurrently with FIG. 6A, is a top view of USB boot taken at section 6B-6B of FIG. 6A showing enclosure 115 of USB boot 69. USB boot 69 also includes walls 116A-116E, flanges 118A and 118B, and channels 120A-120E. USB boot 69 comprises a sleeve for receiving USB interface 32 of TCI 12 to seal USB interface 32. In the embodiment shown, USB boot 69 comprises a five-sided, quadrangular enclosure having walls 116A-116B that surround enclosure 115. Enclosure 115 is sized to snuggly receives USB interface 32 to prevent moisture and fluid from entering the electrical components of USB interface 32, and to prevent USB interface 32 from easily dislodging boot 69. In one embodiment, boot 69 is comprised of silicon rubber, which both seals and grips USB interface 32.

USB boot 69 is sized to fit within boot tray 90 of bottom case 16 (FIG. 5). The heights of walls 116A, 116B and 116C are sized to fit snugly between top case 14 and bottom case 16 when data logger 10 is assembled. The widths of walls 116A and 116B are sized to extend boot 69 across ribs 104A and 104B such that wall 116C engages rib 104C within boot tray 90 (FIG. 4A). Thus, when USB boot 69 is positioned within boot tray 90, channels 120A and 120D engage rib 104B, channels 120B and 120C engage rib 104A, and channel 120E engages rib 104C to restrain movement of USB boot 69 within boot tray 90. Additionally, flanges 118A and 118B engage rib 104D (FIG. 4A) and rib 112 (FIG. 5), respectively, to further restrain USB boot 69. Thus, USB interface 32 can be forced into enclosure 115 to seal USB interface 32 and restrain plug 35, and USB interface 32 can be withdrawn from enclosure 115 to allow plug 35 to be positioned to engage a computer workstation.

Figure 7A:
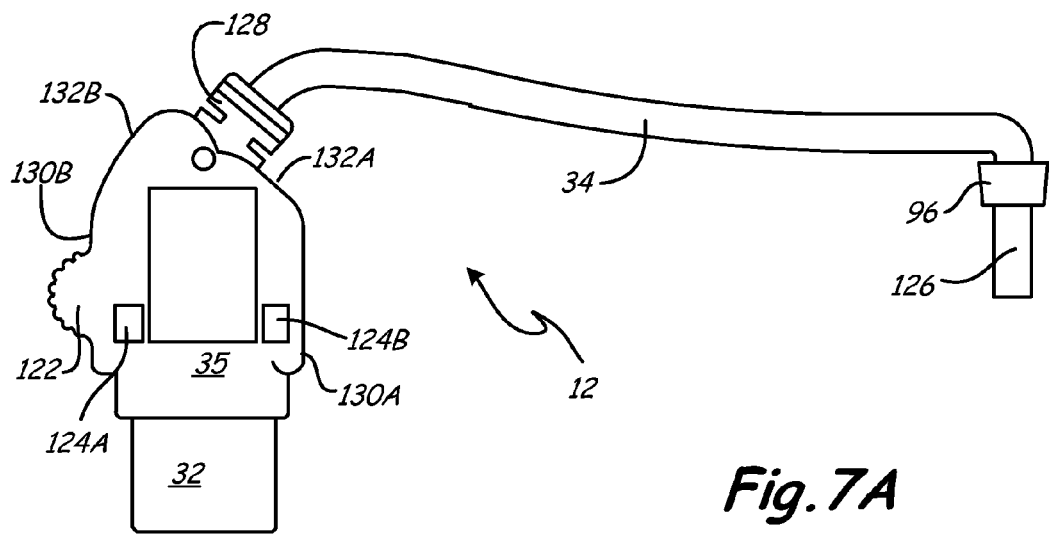
FIG. 7A shows a bottom view of a USB connector and a communication cable of the tethered communication interface of FIG. 1.
Figure 7B:
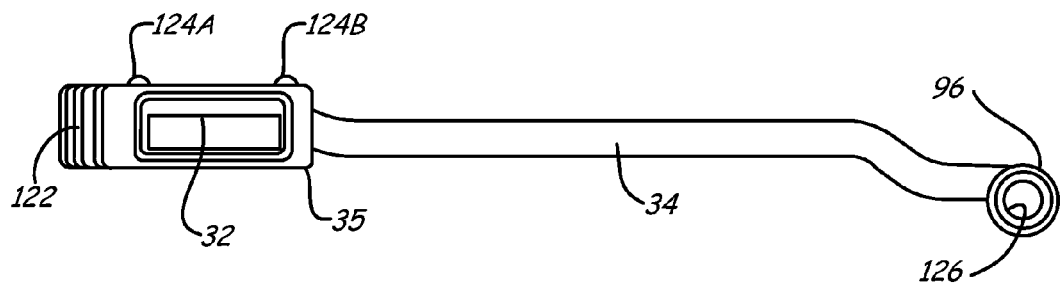
FIG. 7B shows a side view of the USB connector and communication cable of FIG. 7A.

FIG. 7A shows a bottom view of USB interface 32, cable 34 and plug 35 of tethered communication interface (TCI) 12 of FIG. 1. FIG. 7B, which is discussed concurrently with FIG. 7A, shows a side view of TCI 12 of FIG. 4A. TCI 12 comprises a flexible and repositionable extension of circuitry 36 that permits data logger 10 to interface with a computer workstation. TCI 12 includes USB interface 32, cable 34, plug 35, grommet 96, grip 122 and guides 124A and 124B. Grommet 96, which is configured to be inserted into USB port 70 within outer edge 100 of top case 14, includes collar 126 that is configured to be inserted into opening 97 (FIG. 4B) within circuitry wall 98. Grommet 96 and collar 126 are force fit into USB port 70 and opening 97, respectively, to prevent moisture and fluid from entering circuitry tray 84. Collar 126 comprises a hollow extension of cable 34 that permits wires within cable 34 to be connected to circuitry 36. Cable 34 extends from grommet 96 to plug 35 and comprises a flexible length of waterproof material, such as silicon rubber. The length of cable 34 permits plug 35 to be inserted into USB boot 69 such that any excess cord is able to be tucked into channel 30 within the confines of recessed edges 109 and 110 of top case 14 and bottom case 16, respectively. Cable 34 includes flexible collar 128 that joins with plug 35 at an angle offset from the orientation of USB interface 32. Flexible collar 128 prevents moisture and fluid from entering plug 35 from around cable 34, and also permits cable 34 to bend with respect to plug 35.

Plug 35 is shaped to permit TCI 12 to be easily tucked into channel 30 and to be easily deployed from USB boot 69. Plug 35 comprises a generally flat, polygonal shaped plug for insertion into slide area 88 of bottom case 16. Plug 35 includes sidewalls 130A and 130B that extend generally parallel to the major axis of USB interface 32. Rear walls 132A and 132B extend from sidewalls 130A and 130B at angles such that flexible collar 128 is oblique to the direction of the major axis of USB interface 32. For example, in one embodiment, rear wall 132B is at an approximately thirty degree angle from the bottom edge of USB interface 32 as shown in FIG, and rear wall 132A is at an approximately sixty degree angle from the bottom edge of USB interface 32. Additionally, side wall 130B and rear wall 132B are contoured to match a contour along recessed edges 102 and 108 of top case 14 and bottom case 16, respectively. Grip 122, however, is configured to extend past recessed edges 102 and 108 to extend beyond the outer perimeter of top case 14 and bottom case 16. As such, when USB interface 32 is plugged into USB boot 69, cable 34 is completely recessed into channel 30 and plug 35 is completely recessed into slide area 88, but for grip 122. Grip 122 comprises a small, rounded protrusion extending from sidewall 130B to facilitate extraction of USB interface 32 from USB boot 69 and increase the ease of use of data logger 10 for an operator. Grip 122 includes small ridges to facilitate the ability of an operator to gain traction on grip 122. Grip 122 also includes guides 124A and 124B that facilitate insertion of plug 35 into slide area 88. Guides 124A and 124B comprise small protrusion that are configured to ride within tracks 113A and 113B of slide area 88 to align USB interface 32 with enclosure 115 of USB boot 69. Guides 124A and 124B comprise rectangles that have their major axes aligned parallel to the direction in which USB interface 32 extends. Guides 124A and 124B have widths that are slightly smaller than widths of tracks 113A and 113B such that guides 124A and 124B remain approximately orthogonal to tracks 113A and 113B. Thus, when guides 124A and 124B are aligned within tracks 113A and 113B, USB interface 32 will be aimed parallel to enclosure 115.

FIG. 8A shows a front view of data logger 10 of FIG. 1 with tethered communication interface (TCI) 12 in a stowed position. FIG. 8B shows a side view of data logger 10 of FIG. 8A with TCI 12 in a stowed position. FIG. 8C shows a bottom view of data logger 10 of FIG. 8A with TCI 12 in a stowed position. FIGS. 8A-8C are discussed concurrently. TCI 12 is configured in a stowed position within channel 30 between top case 14 and bottom case 16 such that plug 35, cable 34, USB interface 32 and grommet 96 (FIG. 7A) are concealed within data logger 10. Grip 122 protrudes from channel 30 such that an operator or user of data logger 10 is able to interact with plug 35 to remove USB interface 32 from USB boot 69 (FIG. 3). Plug 35 is however tucked within case 14 and case 16 such that cable 34 is out of harm's way and less likely to be damaged during operation and use of data logger 10. Within channel 30, USB interface 32 is secured inside boot 69 to prevent moisture from entering USB interface 32, and to inhibit plug 35 from falling out of channel 30. With USB interface 32 inserted into boot 69, cable 34 is extended out along the contour of channel 30 such that slack is taken out of cable 34. Detents 110A-110C maintain cable 34 positioned inside channel 30 to prevent dislodgment of cable 34 and plug 35. Tab 111 maintains grommet 96 engaged in opening 97 within circuitry wall 98 (FIG. 4B). Thus, circuitry 36 (FIG. 3) is maintained sealed within circuitry walls 98 and 106 between top case 14 and bottom case 16. In one embodiment of the invention, data logger 10 is sealed to a National Electrical Manufacturers Association (NEMA) 6 rating for ingress protection. Plug 35 extends to the outer perimeter of top case 14 and bottom case 16 such that plug 35 remains concealed, but grip 122 protrudes from channel 30. Grip 122 permits USB interface 32 to be easily slid from boot 69 such that plug 35 can be removed from channel 30 and cable 34 can be extended out from cases 14 and 16. Guides 124A and 124B (FIG. 7A) fit into tracks 113A and 113B, respectively, to facilitate easy insertion of USB interface 32 into boot 69. USB interface 32, plug 35 and USB cable 34 are recessed into the interior of cases 14 and 16 to give data logger 10 a compact, leak proof design. Thus, data logger 10 can be connected to a computer workstation without the need for rigidly mounting cases 14 and 16 directly to the workstation. Thus, data logger 10 can be mounted to workstations in which communication ports, such as USB ports, are partially concealed or in hard to reach places. Additionally, cable 34 allows data logger 10 to be oriented toward a user or operator when connected to the workstation. Thus, cable 34 permits data logger 10 to be extended away from USB interface 32 to facilitate easy connection and use of data logger 10.

Although the present invention has been described with reference to preferred embodiments, workers skilled in the art will recognize that changes may be made in form and detail without departing from the spirit and scope of the invention.

The invention claimed is:
1. A data logger comprising:
  a sensor for sensing an environmental condition of the data logger;
  a timer for providing a temporal scale to the sensed environmental condition;
  a memory device for storing data provided by the sensor and the timer;
  circuitry connected to the sensor, the timer and the memory device for conditioning data provided by the sensor, the timer and the memory device;
  a casing for containing the sensor, the timer, the memory device and the circuitry in a waterproof enclosure;
  a data communication linkage extending from the circuitry and through the circuitry compartment to allow data to be extracted from the memory device, the data linkage comprising:
  a USB connector;
  a plug connected to the USB connector, the plug including:
    a polygonal body having;
    a first wall from which the USB connector extends generally perpendicularly;
    first and second side walls extending from the first wall generally parallel to the USB connector; and
    first and second side walls extending from the first wall generally parallel to the USB connector; and
    first and second rear walls extending from the first and second side walls, respectively, at angles oblique to the first wall, the USB cable extending from the second rear wall;
  a USB cable having a first end extending from the plug; and
  a grommet connected to a second end of the USB cable for connecting the USB cable to the casing; and
  a channel extending along an edge perimeter of the casing such that the USB connector, the plug, an entire length of the USB cable and an entirety of the grommet are at least partially shrouded within the casing;
  wherein:
    the plug includes guides extending from a first surface connecting the first wall, the first and second side walls, and the first and second end walls; and
    the channel includes tracks for receiving the guides and directing the plug into the channel such that the USB connector aligns parallel to the enclosure;
    the guides comprise raised rectangular bodies; and
    the tracks comprise:
      recessed elongate channels having widths approximately equal to widths of the raised rectangular bodies such that the guides align the plug in a direction of the tracks; and
      recessed entrance portions wider than the elongate channels that narrow toward the elongate channels.
2. The data logger of claim 1 wherein the USB cable is flexible to permit the USB connector is to be extended from the channel.
3. The data logger of claim 1 wherein the first side wall and the first rear wall have a contour matching a contour of a portion of the edge perimeter of the casing.
4. The data logger of claim 1 wherein the casing includes a boot having an enclosure opening to the channel to receive the USB connector, the boot capable of providing a seal around the USB connector.
5. The data logger of claim 1 wherein the plug further comprises a grip extending from the first wall to facilitate removal of the plug from the channel.
6. The data logger of claim 1 wherein the channel includes detents for retaining the USB cable within the channel.
7. A data logger comprising:
  a sensor for sensing an environmental condition of the data logger;
  a timer for providing a temporal scale to the sensed environmental condition;
  a memory device for storing data provided by the sensor and the timer;
  circuitry connected to the sensor, the timer and the memory device for conditioning data provided by the sensor, the timer and the memory device;
  a casing for containing the sensor, the timer, the memory device and the circuitry in a waterproof enclosure;
  a data communication linkage extending from the circuitry and through the circuitry compartment to allow data to be extracted from the memory device, the data linkage comprising:
  a USB connector;
  a plug connected to the USB connector;
  a USB cable having a first end extending from the plug; and
  a grommet connected to a second end of the USB cable for connecting the USB cable to the casing; and
  a channel extending along an edge perimeter of the casing such that the USB connector, the plug, the USB cable and the grommet are shrouded within the casing;
  wherein the USB cable is flexible to permit the USB connector is to be extended from the channel;
  wherein the plug comprises:
    a polygonal body having:
    a first wall from which the USB connector extends generally perpendicularly;
    first and second side walls extending from the first wall generally parallel to the USB connector; and
    first and second rear walls extending from the first and second side walls, respectively, at angles oblique to the first wall, the USB cable extending from the second rear wall;
    wherein the polygonal body fits completely within the channel;
  wherein the first side wall and the first rear wall have a contour matching a contour of a portion of the edge perimeter of the casing;
  wherein the casing includes a boot having an enclosure opening to the channel to receive the USB connector, the boot capable of providing a seal around the USB connector;
  wherein the plug further comprises a grip extending from the first wall to facilitate removal of the plug from the channel;
  wherein the channel includes detents for retaining the USB cable within the channel;
  wherein the plug includes guides extending from a first surface connecting the first wall, the first and second side walls, and the first and second end walls, and the channel includes tracks for receiving the guides and directing the plug into the channel such that the USB connector aligns parallel to the enclosure; and wherein:
the guides comprise raised rectangular bodies; and
the tracks comprise:
recessed elongate channels having widths approximately equal to widths of the raised rectangular bodies such that the guides align the plug in a direction of the tracks; and
recessed entrance portions wider than the elongate channels that narrow toward the elongate channels.

\* \* \* \* \*